US010838602B2

(12) United States Patent
Kim

(10) Patent No.: US 10,838,602 B2
(45) Date of Patent: *Nov. 17, 2020

(54) PERSUASIVE PORTLETS

(71) Applicant: International Business Machines Corporation, Armonk, NY (US)

(72) Inventor: Steven Paul Kim, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 458 days.

This patent is subject to a terminal disclaimer.

(21) Appl. No.: 15/145,332

(22) Filed: May 3, 2016

(65) Prior Publication Data

US 2016/0246496 A1    Aug. 25, 2016

Related U.S. Application Data

(63) Continuation of application No. 10/873,549, filed on Jun. 22, 2004, now Pat. No. 9,330,187.

(51) Int. Cl.
| | | |
|---|---|---|
| *G06F 3/0484* | (2013.01) | |
| *G06F 16/954* | (2019.01) | |
| *H04L 29/08* | (2006.01) | |
| *G06F 40/106* | (2020.01) | |

(52) U.S. Cl.
CPC ........ *G06F 3/04847* (2013.01); *G06F 16/954* (2019.01); *G06F 40/106* (2020.01); *H04L 67/02* (2013.01); *H04L 67/306* (2013.01); *H04L 67/36* (2013.01)

(58) Field of Classification Search
CPC .............. G06F 3/04847; G06F 17/212; G06F 17/30873; H04L 67/02; H04L 67/306; H04L 67/36
See application file for complete search history.

(56) References Cited

U.S. PATENT DOCUMENTS

| | | | | |
|---|---|---|---|---|
| 3,556,047 A | * | 1/1971 | Wassell ................... | G09F 15/00 116/322 |
| 4,806,919 A | * | 2/1989 | Nakayama ............ | G06F 3/0481 345/545 |
| 4,974,174 A | * | 11/1990 | Kleinman ........... | G06F 3/04845 345/662 |
| 5,060,170 A | * | 10/1991 | Bourgeois ................ | G09G 5/14 715/788 |
| 5,371,847 A | * | 12/1994 | Hargrove .............. | G06F 3/0481 715/788 |
| 5,577,187 A | * | 11/1996 | Mariani ................ | G06F 3/0481 715/792 |

(Continued)

FOREIGN PATENT DOCUMENTS

CA        2406569        4/2004

OTHER PUBLICATIONS

"Portlet Development Guide—working with the Portlet API 1.1" by Hesmer et al.; pub date: Apr. 2, 2002.*

*Primary Examiner* — Jung-Mu T Chuang
(74) *Attorney, Agent, or Firm* — Daniel M. Yeates

(57) ABSTRACT

A new or existing portlet queries the category attribute of other portlets on a portal page. The new or existing portlet may take a position adjacent to other portlets having the same category attribute. The new or existing portlet may adjust its size or one or more of the other portlets may adjust their size so that the portlets are aligned with one another.

46 Claims, 6 Drawing Sheets

(56) References Cited

U.S. PATENT DOCUMENTS

| | | | |
|---|---|---|---|
| 5,649,216 A * | 7/1997 | Sieber | G06T 11/60 715/234 |
| 5,657,463 A * | 8/1997 | Bingham | G09G 5/14 715/799 |
| 5,760,772 A * | 6/1998 | Austin | G06F 3/0481 715/798 |
| 5,796,402 A * | 8/1998 | Ellison-Taylor | G09G 5/14 715/792 |
| 6,043,817 A * | 3/2000 | Bolnick | G06F 3/0481 715/788 |
| 6,111,573 A * | 8/2000 | McComb | G09G 5/363 345/661 |
| 6,161,126 A * | 12/2000 | Wies | G05B 19/00 709/203 |
| 6,310,605 B1 * | 10/2001 | Rosenberg | G06F 3/011 345/157 |
| 6,373,506 B1 | 4/2002 | Hosomi | |
| 6,473,093 B1 * | 10/2002 | Halstead, Jr. | G06F 9/451 345/619 |
| 6,520,308 B1 * | 2/2003 | Martin | G07D 3/06 194/317 |
| 6,654,036 B1 * | 11/2003 | Jones | G06F 3/0481 715/788 |
| 6,707,476 B1 * | 3/2004 | Hochstedler | G06F 19/3418 715/789 |
| 6,717,556 B2 * | 4/2004 | Asahi | G06F 3/1423 345/1.1 |
| 6,804,416 B1 * | 10/2004 | Bachelder | G06K 9/6253 345/651 |
| 6,844,887 B2 * | 1/2005 | Laffey | G06F 3/04812 715/835 |
| 6,859,819 B1 * | 2/2005 | Rosenberg | G06F 3/016 709/201 |
| 6,928,610 B2 * | 8/2005 | Brintzenhofe | G06F 40/14 715/202 |
| 7,013,432 B2 * | 3/2006 | Taylor | G06F 3/0481 715/788 |
| 7,062,511 B1 | 6/2006 | Poulsen | |
| 7,064,772 B1 * | 6/2006 | Thompson | G06F 9/451 345/661 |
| 7,072,934 B2 | 7/2006 | Helgeson | |
| 7,284,054 B2 * | 10/2007 | Radhakrishnan | G06F 9/5016 705/14.1 |
| 7,310,793 B1 * | 12/2007 | Teig | H01L 23/528 257/774 |
| 7,313,601 B2 * | 12/2007 | Fischer | H04L 63/08 709/217 |
| 7,367,014 B2 * | 4/2008 | Griffin | G06F 21/604 717/107 |
| 7,376,739 B2 * | 5/2008 | Ramaswamy | H04L 67/02 709/226 |
| 7,469,378 B2 * | 12/2008 | Nagahara | G06F 40/103 715/243 |
| 7,533,142 B2 * | 5/2009 | Ng | G06F 16/957 709/202 |
| 7,576,756 B1 * | 8/2009 | Good | G06F 3/0481 345/635 |
| 7,660,899 B2 | 2/2010 | Gavrilescu | |
| 7,694,000 B2 | 4/2010 | Flores | |
| 7,707,255 B2 * | 4/2010 | Satterfield | G06F 3/0481 709/206 |
| 7,761,878 B2 | 7/2010 | Wei | |
| 7,853,883 B2 * | 12/2010 | Guido | H04L 67/02 715/243 |
| 7,890,877 B2 * | 2/2011 | Ritchy | G06F 16/958 715/762 |
| 7,895,234 B2 * | 2/2011 | Lillie | G06F 16/958 707/784 |
| 7,930,364 B2 * | 4/2011 | Ramaswamy | H04L 67/02 709/218 |
| 7,996,770 B2 | 8/2011 | Chakravarthy | |
| 8,056,014 B2 | 11/2011 | Brockway et al. | |
| 8,099,591 B2 * | 1/2012 | Crandall | G11B 27/105 713/1 |
| 8,508,469 B1 * | 8/2013 | Rosenberg | B25J 9/1692 345/156 |
| 8,615,786 B1 * | 12/2013 | Bryce | H04L 67/025 726/17 |
| 9,513,787 B2 * | 12/2016 | Caire | G06F 8/34 |
| 2001/0009016 A1 | 7/2001 | Hofmann | |
| 2001/0023414 A1 | 9/2001 | Kumar et al. | |
| 2001/0034771 A1 | 10/2001 | Hutsch | |
| 2002/0102402 A1 * | 8/2002 | Neuburger | B32B 37/226 428/355 RA |
| 2002/0165721 A1 | 11/2002 | Chang | |
| 2002/0169852 A1 | 11/2002 | Schaeck | |
| 2002/0191026 A1 * | 12/2002 | Rodden | G06F 3/0481 715/779 |
| 2002/0196287 A1 * | 12/2002 | Taylor | G06F 3/0481 715/792 |
| 2003/0007016 A1 * | 1/2003 | Laffey | G06F 3/04812 715/861 |
| 2003/0040921 A1 | 2/2003 | Hughes | |
| 2003/0055624 A1 | 3/2003 | Fletcher et al. | |
| 2003/0065706 A1 | 4/2003 | Smyth | |
| 2003/0079177 A1 * | 4/2003 | Brintzenhofe | G06F 40/103 715/205 |
| 2003/0117437 A1 | 6/2003 | Cook | |
| 2003/0121983 A1 | 7/2003 | Herle | |
| 2003/0126558 A1 * | 7/2003 | Griffin | G06F 21/604 715/234 |
| 2003/0137538 A1 | 7/2003 | Hesmer | |
| 2003/0149722 A1 | 8/2003 | Jolley et al. | |
| 2003/0167315 A1 | 9/2003 | Chowdhry et al. | |
| 2003/0216969 A1 * | 11/2003 | Bauer | G06K 7/0008 705/22 |
| 2003/0222922 A1 * | 12/2003 | Rummel | G06F 8/34 715/789 |
| 2003/0233425 A1 | 12/2003 | Lyons | |
| 2004/0001565 A1 | 1/2004 | Jones et al. | |
| 2004/0003096 A1 | 1/2004 | Willis | |
| 2004/0030795 A1 | 2/2004 | Hesmer et al. | |
| 2004/0054749 A1 | 3/2004 | Doyle | |
| 2004/0066966 A1 * | 4/2004 | Schneiderman | G06K 9/527 382/159 |
| 2004/0068554 A1 | 4/2004 | Bales et al. | |
| 2004/0068568 A1 | 4/2004 | Griffin | |
| 2004/0090969 A1 * | 5/2004 | Jerrard-Dunne | G06F 16/954 370/395.54 |
| 2004/0098467 A1 | 5/2004 | Dewey | |
| 2004/0205555 A1 | 10/2004 | Hind | |
| 2004/0212640 A1 | 10/2004 | Mann et al. | |
| 2004/0243577 A1 | 12/2004 | Choudhary | G06F 16/958 |
| 2004/0260600 A1 * | 12/2004 | Gross | G06Q 30/02 705/7.31 |
| 2005/0010634 A1 | 1/2005 | Henderson et al. | |
| 2005/0015803 A1 * | 1/2005 | Macrae | H04N 5/44543 725/41 |
| 2005/0021765 A1 | 1/2005 | Flores | |
| 2005/0065913 A1 | 3/2005 | Lillie et al. | |
| 2005/0091596 A1 * | 4/2005 | Anthony | G06F 3/04815 715/712 |
| 2005/0102617 A1 * | 5/2005 | Nagahara | G06F 40/103 715/249 |
| 2005/0175015 A1 * | 8/2005 | Ramaswamy | H04L 67/02 370/395.52 |
| 2005/0192924 A1 * | 9/2005 | Drucker | G06F 3/0483 |
| 2005/0198201 A1 | 9/2005 | Bohn et al. | |
| 2006/0031377 A1 * | 2/2006 | Ng | G06F 16/957 709/208 |
| 2006/0235935 A1 * | 10/2006 | Ng | H04L 29/06 709/208 |
| 2007/0006095 A1 * | 1/2007 | Feng | G06F 3/0481 715/800 |
| 2007/0038610 A1 * | 2/2007 | Omoigui | H04L 29/06 |
| 2007/0124701 A1 | 5/2007 | Gong | |
| 2007/0136417 A1 * | 6/2007 | Kreiner | G06F 16/986 709/203 |

(56) References Cited

U.S. PATENT DOCUMENTS

| | | | |
|---|---|---|---|
| 2007/0279392 A1* | 12/2007 | Rosenberg | A63F 13/285 345/173 |
| 2008/0201476 A1* | 8/2008 | Ramaswamy | H04L 67/02 709/226 |
| 2008/0282162 A1 | 11/2008 | Lincke | |
| 2011/0099512 A1* | 4/2011 | Jeong | G06F 3/0481 715/790 |
| 2011/0265043 A1* | 10/2011 | Knitowski | G06F 3/04812 715/835 |
| 2012/0144309 A1* | 6/2012 | Zendler | G06F 3/04815 715/739 |
| 2014/0237350 A1* | 8/2014 | Ryall | G06F 40/106 715/234 |
| 2015/0205447 A1* | 7/2015 | Jia | G09G 5/14 715/790 |
| 2018/0024731 A1* | 1/2018 | Sanches et al. | G06F 8/38 715/763 |

\* cited by examiner

PERSUASIVE PORTLETS

CROSS-REFERENCE TO RELATED APPLICATIONS

This application is a Continuation of U.S. patent application Ser. No. 10/873,549, filed on Jun. 22, 2004, the entirety of which is incorporated herein by reference.

BACKGROUND OF THE INVENTION

The present invention relates generally to web portals, and more specifically, to portlets that change size and position based on the surrounding portlets.

Web portals provide a means of delivering aggregated, personalized content to computer users. Typically, a portal server includes a portal program (e.g., WebSphere® Portal Server from International Business Machines Corp. (IBM) of Armonk, N.Y.—WebSphere® is a registered trademark of IBM), which obtains and aggregates portal content into a portal page. The portal page includes sections or visual portlets that each contain particular portal content formatted according to a user's preferences. A portal is a type of content framework which is designed to serve as a gateway, or focal point, for end users to access an aggregation or collection of information and applications from many different sources. For example, a user could establish his/her own portal page that has sections for news, weather and sports. When the page is requested, the portal program would obtain the portlets from the appropriate content providers.

A portal page is often structured in row and column format. The obtained portlets may be added to the portal page either statically or dynamically. In a static portal page, the administrator of the page determines the size and position of the portal based on its content or other parameters. For example, a particular portal page may only allow box scores and weather to be added to the left hand column while news may only be added to the right hand column. The end-user may be able to manually change the location of the specific portlet within each column (i.e., box scores followed by weather) but the user cannot change the size of the portlet or align items in each column together. In a dynamic portal page, the size and location of the portlet is based on the design constraints of the portal page itself. For example, the size of the portlet is based on the predetermined dimensions of the row and/or column. The end-user may again change the location of the portlet but may not change the size of the portlet or its alignment relative to other portlets.

BRIEF SUMMARY OF THE INVENTION

According to one aspect of the present invention, a portlet is manipulated on a portal page by comparing a category attribute of the portlet with another portlet. The portlet is then located adjacent to the other portlet on the portal page if the category attribute of the portlet is the same as the category attribute of the other portlet. Further, the size of the portlet or the other portlet may be adjusted so that the portlets are aligned with each other.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
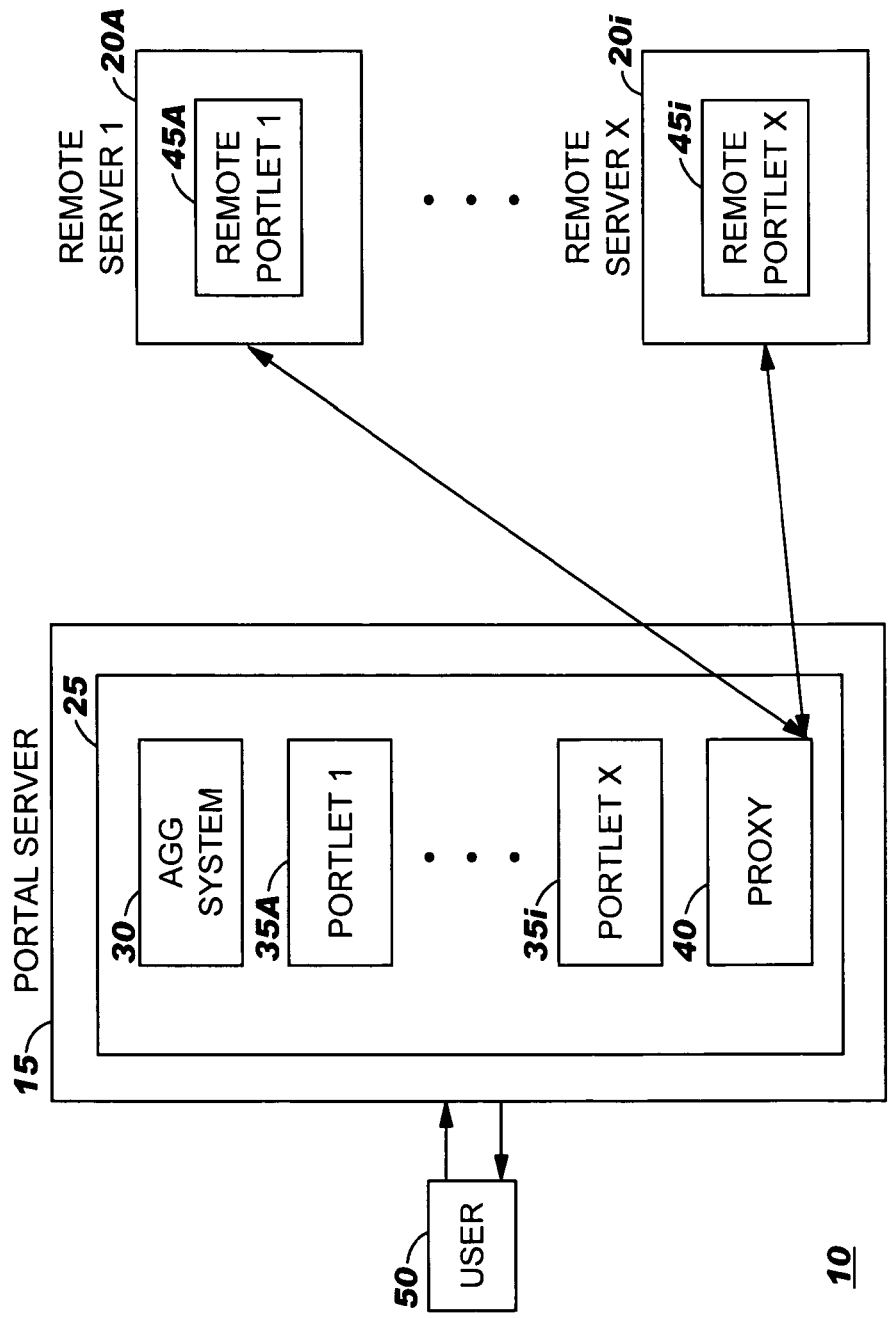
FIG. 1 illustrates a system for handling portlets.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a system 10 for portlet handling is shown. The system 10 includes a portal server 15 and a plurality of remote servers 20A-20i. The portal server 15 includes a portal program 25 (e.g., IBM's WebSphere® Portal Server), which itself may include, among other things, an aggregation system 30, a plurality of portlets 35A-35i and a proxy 40. The proxy 40 communicates with the remote servers 20A-20i to retrieve appropriate remote portlets 45A-45i. A user 50 communicates with the portal server 15 to request and receive portal content. When the user 50 makes a request for portal content, the portal program 25 will receive the request and invoke the appropriate portlets 35A-35i and the proxy 40 to retrieve the requested content. Specifically, the portlets 35A-35i will generate particular types of portal content while the proxy 40 causes the appropriate remote portlets 45A-45i to generate other portal content. The content generated by the appropriate remote portlets 45A-45i will then be transmitted to the portal server 15. Once all of the requested portal content has been obtained, it will be aggregated via the aggregation system 30 and displayed to the user 50 as a portal page (not shown). It will be appreciated to those skilled in the art that the portal page may be displayed on any appropriate device using any appropriate display application. In this manner, the user utilizes a thin client to receive portal content. However, it will be appreciated to those skilled in the art that the present invention is not in any way to limited to a thin client as the user may utilize any appropriate application to receive portal content.

Figure 2:
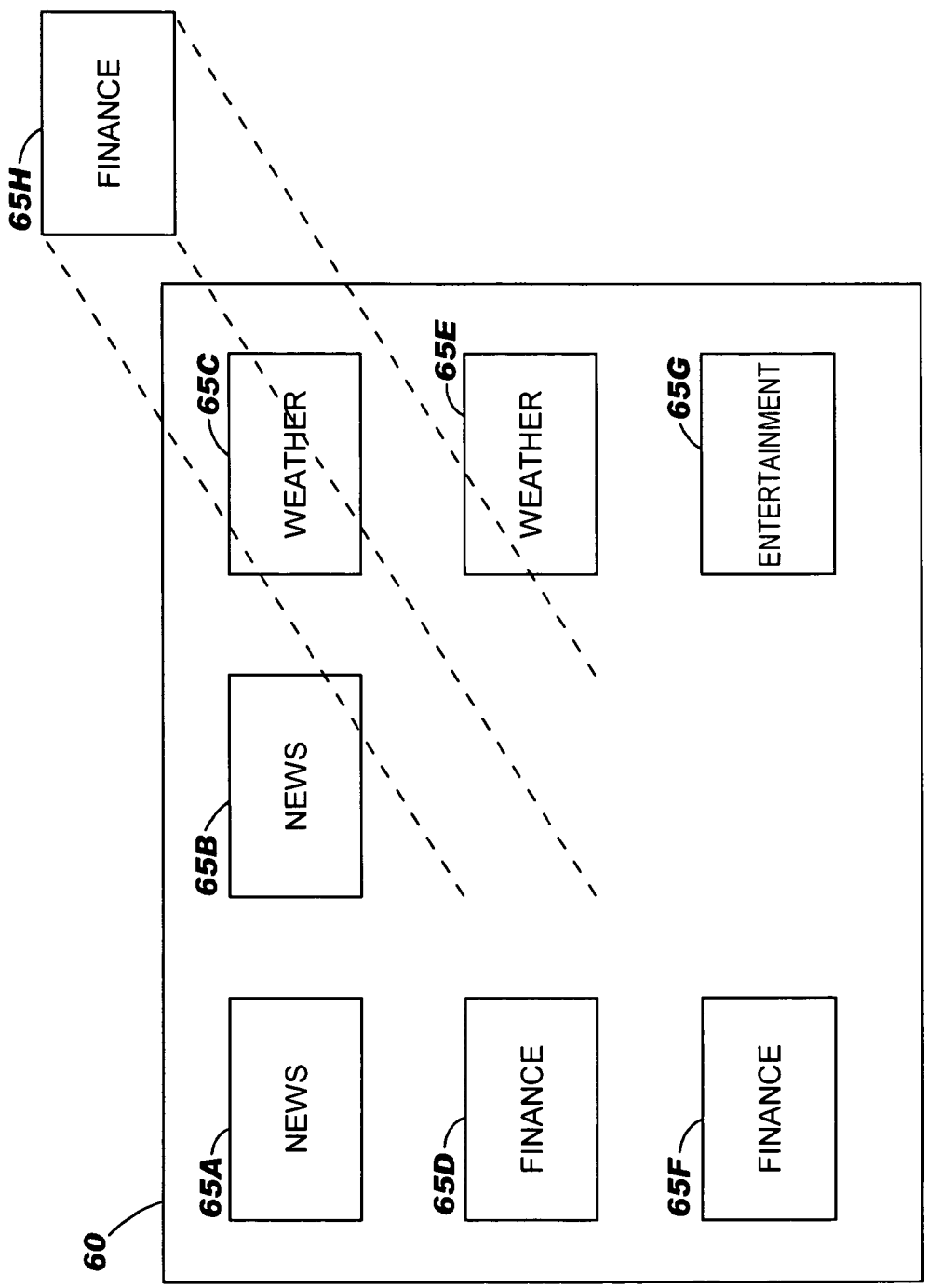
FIG. 2 illustrates a portal page according to one aspect of the present invention.

Referring now to FIG. 2, a portal page 60 according to the present invention is shown. The portlet page 60 includes a plurality of portlets 65A-65G arranged in three (3) rows and three (3) columns. It will be appreciated by those skilled in the art that the disclosed arrangement is for illustrative purposes only and that the portal page may have any appropriate arrangement. In addition, the portlets 65A-65G may include remote portlets, portal server portals or any combination thereof. Each of the portlets 65A-65G include a category attribute identifying the content of the portlet. In the illustrative example, portlets 65A, B are news portlets, portlets 65C, E are weather portlets, portlets 65D, F are finance portlets and portlet G is an entertainment portlet. It will be appreciated by those skilled in the art that any combination and types of portlets may be used.

A new portlet 65H may be added to the portal page 60. In the illustrative example, portlet 65H is a finance portlet. As portlet 65 H is a new portlet, it may initially be added to a default position between portlets 65D, E. It will be appreciated by those skilled in the art that the initial position may be any position on the portal page 60 and the default position may be any position on the page as determined by the user, the designer of the portal page or the administrator of the portal page. The new portlet 65H queries all of the surrounding portlets 65A-G to determine if any of the portlets have a category attribute that matches its category attribute. In the illustrated example, portlets 65D, F have the same category attribute. New portlet 65H may take a position in the same column or in the same rows as portlets 65D, F. A new portlet will first attempt to take a position in the same row as a portlet having the same category attribute. If a position in a row is not available then the portlet will attempt to take a position adjacent to and in the same column as a portlet having the same category attribute. In the illustrated embodiment, the portlet 65H will take a position adjacent to and on the same row as portlet 65D.

Figure 3:
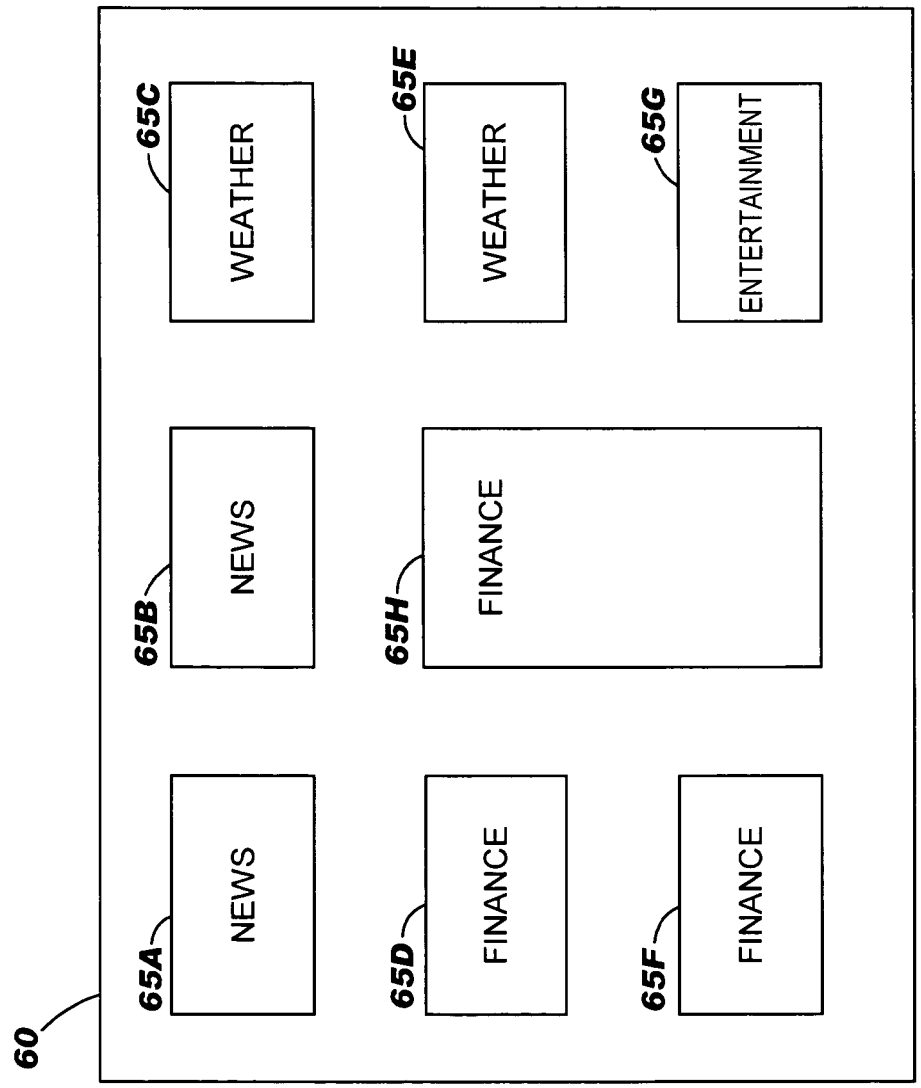
FIG. 3 illustrates a portal page according to another aspect of the present invention.

Now that a potential position of the new portlet 65H has been determined, the new portlet 65H will determine whether to adjust its size or content to align with the other portlets. The new portlet may adjust its size so that it is aligned with those surrounding portlets having the same category attribute as itself or with the surrounding portlets in general so all of the portlets are aligned with one another. It will be appreciated by those skilled in the art that a portlet may adjust its size by any known method such as adjusting the character count of the portlet or adding or removing scroll bars so that all of the contents of the portlet may be viewed. As shown in FIG. 3, portlet 65H may adjust its size so that it is aligned with both finance portlets 65D, F. The new portlet 65H is positioned adjacent to portlets 65D, F as it expanded its size to align itself with those portlets have the same category attribute. The top of the portlet 65H is aligned with the top of portlet 65D while the bottom of portlet 65H is aligned with the bottom of portlet 64F.

Figure 4:
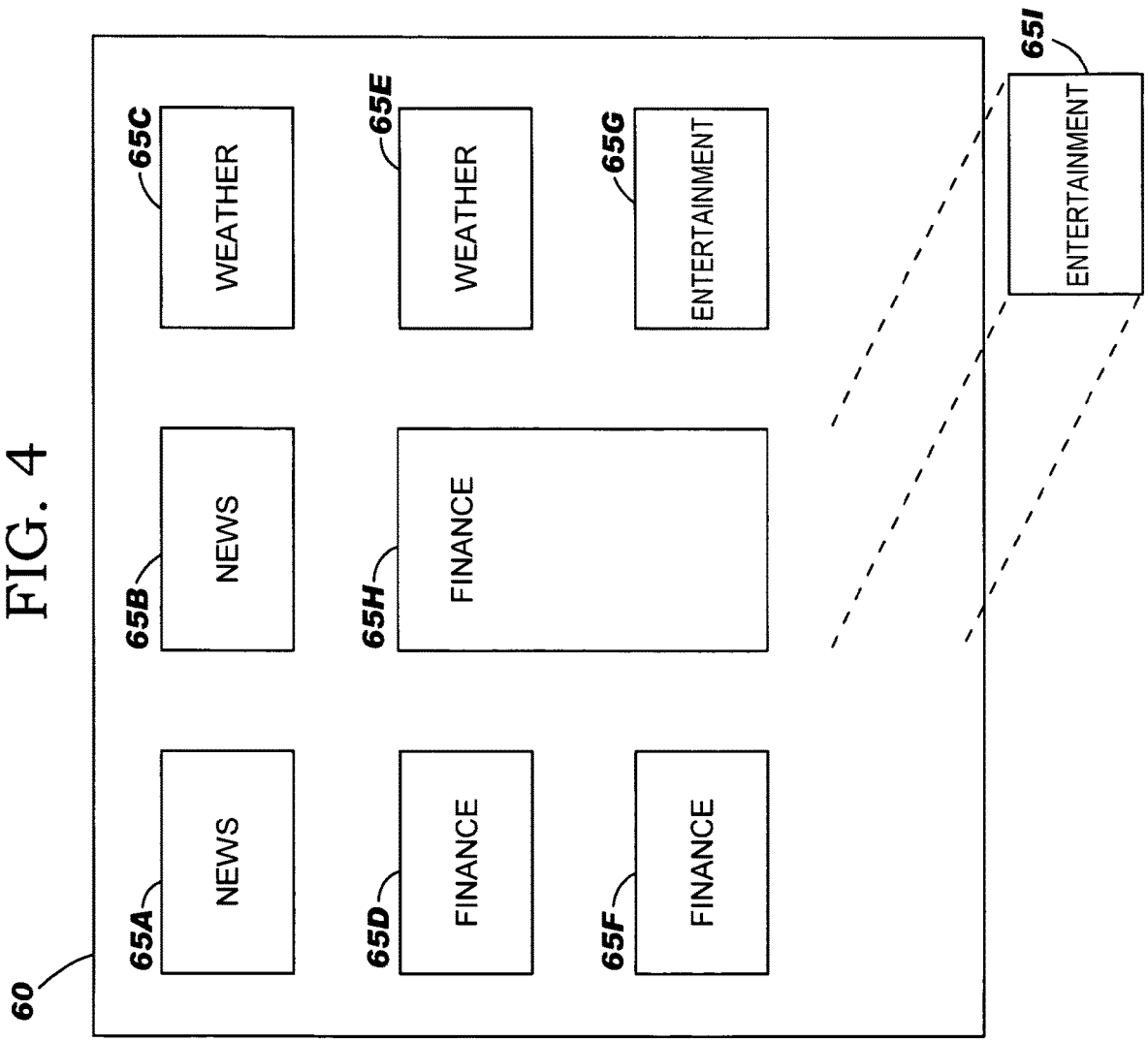
FIG. 4 illustrates a portal page according to further aspect of the present invention.
Figure 5:
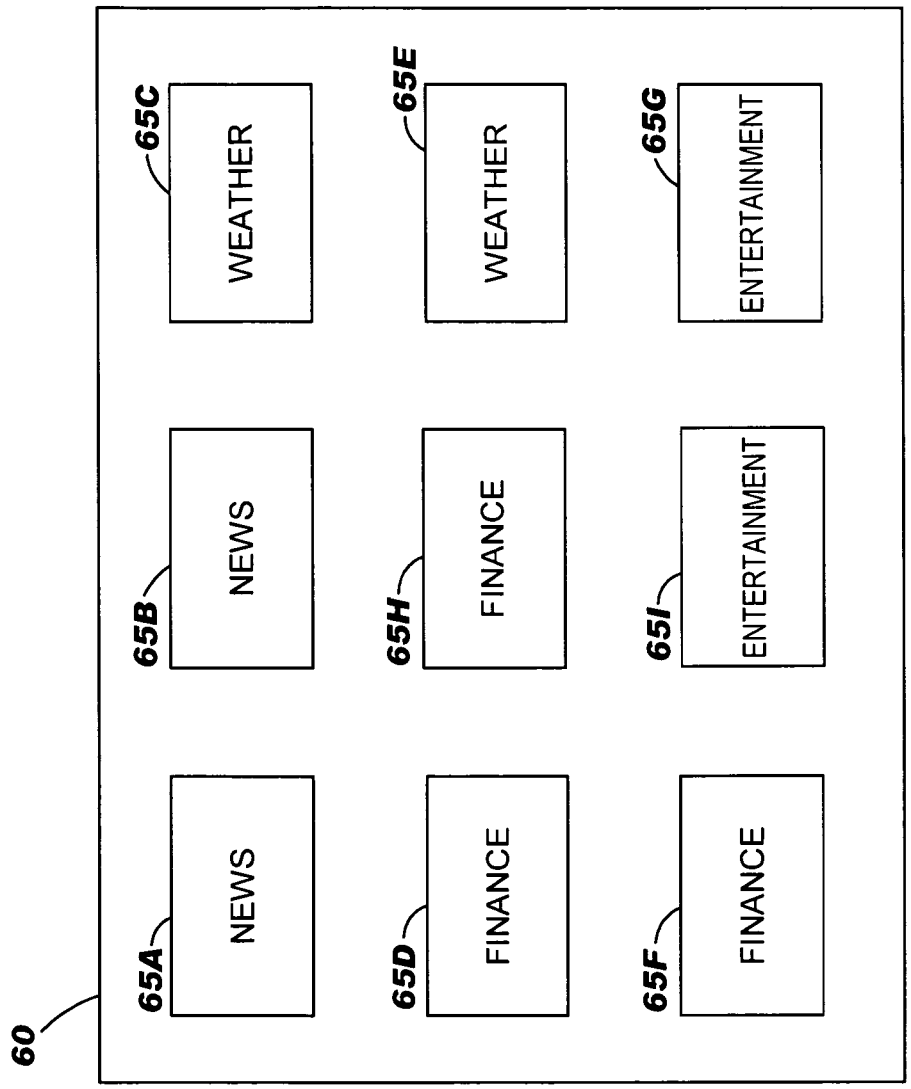
FIG. 5 illustrates a portal page according to a still further aspect of the present invention.

Referring now to FIG. 4, another new portlet 65I may be added to the portal page 60. In the illustrated example, portlet 65I is an entertainment portlet and has an initial default position below the portlet 65H. Portlet 65I queries all of the surrounding portlets 65F-H to determine if any of the portlets have a category attribute that matches its category attribute. As portlet 65G is also an entertainment portlet, one of the desired positions for portlet 65I is adjacent to and in the same row as portlet 65G. Portlet 65H currently occupies the position adjacent to and in the same row as portlet 65G so portlet 65I will attempt to persuade portlet 65H to adjust its position so that portlet 65I may occupy the space adjacent to and on the same row as portlet 65G. Referring now to FIG. 5, portlet 65H adjusts its size so that portlet 65I may occupy the position adjacent to and in the same row as portlet 65G. If portlet 65H is unable to adjust its size, portlet 65I may take a position adjacent to and in the same column as portlet 65G.

It will be apparent to those skilled in the art that the above description applies equally to a new portlet added to a portal page as well as an existing portlet moved from an existing location on the portal page. In addition, the portlets will communicate with each other so that portlets with the same category attribute are positioned adjacent to one another and on the same row. If there are any conflicts, the portlet belonging in the group with the greatest number of portlets will take precedent over another portlet belonging to a smaller group. A new portlet will take the initial default position if none of the surrounding portlets have the same category attribute. It will be appreciated by those skilled in the art that a portlet may query the surrounding portlets on the portal page, all of the portlets on the portal page or any appropriate or desired subset thereof. The feature of changing the position or adjusting the size of the portlet may be set by the end user or any appropriate entity to lock a portlet in place so that its position and/or size remains fixed.

Figure 6:
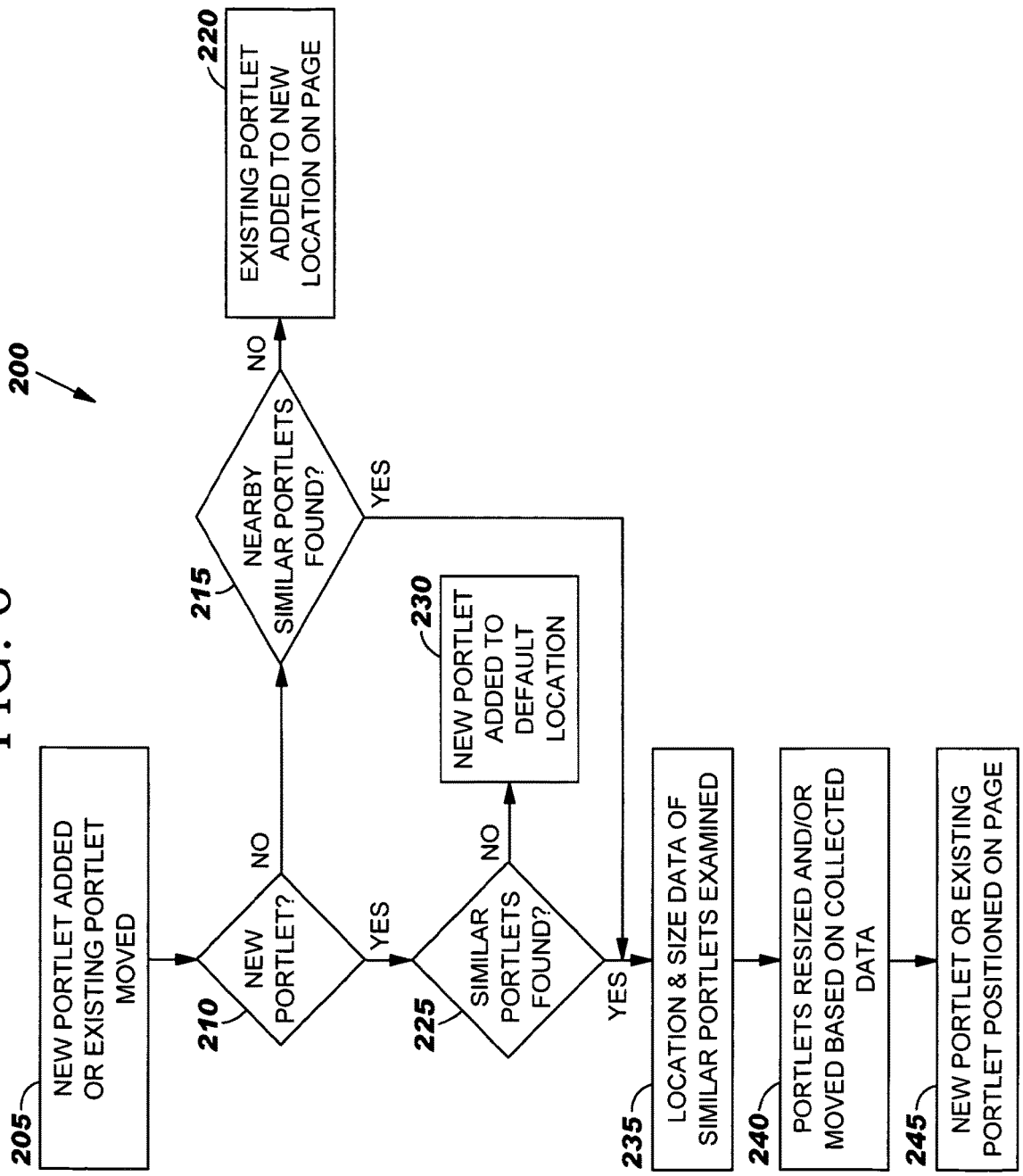
FIG. 6 illustrates a flowchart according to one aspect of the present invention.

Referring now to FIG. 6, a flowchart 200 illustrating possible logic for implementing the present invention is shown. In block 205, a new portlet is added to a portal page or an existing portlet is moved from a first location to a second location. Block 210 determines whether a new portlet has been added. If a new portlet has not been added then the existing portlet that has moved to a new location is evaluated. Block 215 determines if the category attributes of the nearby portlets are similar to the moved portlet. If the categories attributes are not the same then the existing portlet is added to the new location without any other changes in block 220.

Block 225 determines if the category attributes of the other portlets, either nearby portlets or all of the portlets as appropriate, are similar to the new portlet. If the categories attributes are not the same then the new portlet is added to the default location without any other changes in block 230.

If similar portlets are found in blocks 215 or 225, location and size data of the similar portlets is examined in block 235. In block 240, the portlets on the portal page and/or the new or moved portlets are moved and/or resized based on the collected data. As stated above, the portlets are moved or resized so that portlets having similar category attributes are grouped together adjacent to one another. In addition, the size of the portlets are adjusted so that the portlets are aligned with one another. In block 245, the new portlet or the existing portlet are positioned on the portal page.

The flowchart and block diagrams of FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It is apparent to one skilled in the art that numerous modifications and departures from the specific embodiments described herein may be made without departing from the spirit and scope of the invention.

What is claimed is:

1. A method of manipulating a portlet on a portal page, the method comprising:
adding a first portlet to a default initial position in the portal page in an aggregation system of a portal server executing in a memory of a computer;
comparing, by the first portlet, a category attribute of the first portlet and at least one other portlet on the portal page;
identifying, by the first portlet, based upon the comparison, that a second portlet has a same category as the first portlet, wherein the second portlet is positioned adjacent to a third portlet, and wherein the second portlet is not positioned adjacent to the default initial position;
communicating, by the first portlet, a request to the third portlet for the third portlet to reposition itself so as to allow the first portlet to position itself adjacent to the second portlet and in a same row as the second portlet;
communicating, by the first portlet, a request to the second portlet for the second portlet to adjust its size in order to permit a positioning of the first portlet adjacent to the second portlet on the portal page in the same row as the second portlet; and
responsive both to the repositioning of the third portlet and also to the adjustment of the size of the second portlet;
positioning the first portlet adjacent to the second portlet on the portal page but not aligned with the second portlet on the portal page in the same row as the second portlet;
computing a size for the first portlet so as to align the first portlet with the second portlet on the portal page;
adjusting the size of the first portlet based upon the computation such that the first portlet is aligned with the second portlet based upon the category attribute of the first portlet being the same as the category attribute of the second portlet; and
determining that a fifth portlet is adjacent to at least one other portlet that has the same category attribute as the fifth portlet;
determining that the first portlet belongs to a first group of portlets and that the fifth portlet belongs to a second group of portlets;
determining that the first group of portlets includes a greater number of portlets than the second group of portlets; and
prioritizing positioning of the first portlet over the fifth portlet based on the first group of portlets having the greater number of portlets than the second group of portlets.

2. The method of claim 1, further comprising adjusting the size of the second portlet.

3. The method of claim 2, wherein adjusting the size of the second portlet comprises adjusting the size of the second portlet such that the first portlet is aligned with the second portlet.

4. The method of claim 1, wherein the first portlet is a newly added portlet.

5. The method of claim 1, wherein the first portlet is an existing portlet moved from an existing position.

6. The method of claim 1, wherein positioning the first portlet adjacent to the second portlet on the portal page upon the category attribute of the first portlet being the same as the category attribute of the second portlet comprises positioning the first portlet adjacent to and on the same row as the second portlet.

7. The method of claim 1, wherein positioning the first portlet adjacent to the second portlet on the portal page upon the category attribute of the first portlet being the same as the category attribute of the second portlet comprises positioning the first portlet adjacent to and in a column same as the second portlet.

8. A method of displaying portlets on a portal page, the method comprising:
adding a first portlet to a portal page in an aggregation system of the portal server executing in a memory of a computer;

comparing, by the first portlet, a category attribute of the first portlet with a category attribute of each of a plurality of other portlets;

identifying, by the first portlet, based upon the comparison, that a second portlet of the plurality of other portlets has a same category as the first portlet, but that a third portlet is positioned adjacent to the second portlet;

rendering the first portlet such that it is adjacent to the second portlet by the first portlet communicating a request to the third portlet for the third portlet to reposition itself so as to allow the first portlet to position itself adjacent to the second portlet and in a same row as the second portlet, the first portlet additionally communicating a request to the second portlet for the second portlet to adjust its size in order to permit a positioning of the first portlet adjacent to the second portlet on the portal page in the same row as the second portlet and, responsive both to the repositioning of the third portlet and also to the adjustment of the size of the second portlet positioning the first portlet adjacent to the second portlet on the portal page but not aligned with the second portlet on the portal page in the same row as the second portlet, computing a size for the first portlet so as to align the first portlet with the second portlet on the portal page and adjusting the size of the first portlet based upon the computation such that the first portlet is aligned with the second portlet based upon the category attribute of the first portlet being the same as the category attribute of the second portlet; and determining that a fifth portlet is adjacent to at least one other portlet that has the same category as the fifth portlet;

determining that the first portlet belongs to a first group of portlets and that the fifth portlet belongs to a second group of portlets;

determining that the first group of portlets includes a greater number of portlets than the second group of portlets; and prioritizing positioning of the first portlet over the fifth portlet based on the first group of portlets having the greater number of portlets than the second group of portlets.

9. The method of claim 8, wherein the first portlet is a newly added portlet having an initial default position on the portal page, and wherein comparing the category attribute of the first portlet with the category attribute of each of the plurality of other portlets comprises comparing the category attribute of the first portlet with the category attribute of each of the plurality of other portlets that are immediately surrounding the initial default position.

10. The method of claim 8, wherein the first portlet is an existing portlet moved from a first position to a second position on the portal page, and wherein comparing the category attribute of the first portlet with the category attribute of each of the plurality of other portlets comprises comparing the category attribute of the first portlet with the category attribute of each of the plurality of other portlets that are immediately surrounding the second position.

11. The method of claim 8, wherein rendering the first portlet such that it is adjacent to the second portlet comprises rendering the first portlet such that it is adjacent to and on the same row as the second portlet.

12. The method of claim 8, wherein rendering the first portlet such that it is adjacent to the second portlet comprises rendering the first portlet such that it is adjacent to and in a same column as the second portlet.

13. A method of handling portlets on a portal page, the method comprising:

adding a first portlet to the portal page in an aggregation system of a portal server executing in a memory of a computer;

querying, by the first portlet, a category attribute of a plurality of other portlets;

comparing, by the first portlet, the category attribute of the first portlet and a second portlet on the portal page;

identifying, based upon the comparison, that the second portlet has a same category as the first portlet, but that a third portlet is positioned adjacent to the second portlet;

communicating, by the first portlet, a request to the third portlet for the third portlet to reposition itself so as to allow the first portlet to position itself adjacent to the second portlet and in a same row as the second portlet, the first portlet additionally communicating a request to the second portlet for the second portlet to adjust its size in order to permit a positioning of the first portlet adjacent to the second portlet on the portal page in the same row as the second portlet;

responsive both to the repositioning of the third portlet and also to the adjustment of the size of the second portlet, positioning the first portlet adjacent to the second portlet on the portal page but not aligned with the second portlet on the portal page in the same row as the second portlet, computing a size for the first portlet so as to align the first portlet with the second portlet on the portal page and adjusting the size of the first portlet based upon the computation such that the first portlet is aligned with the second portlet based upon the category attribute of the first portlet being the same as the category attribute of the second portlet, the first portlet taking a position adjacent to at least one of the plurality of other portlets having the same category attribute as the second portlet; and determining that a fifth portlet is adjacent to at least one other portlet that has the same category as the fifth portlet;

determining that the first portlet belongs to a first group of portlets and that the fifth portlet belongs to a second group of portlets;

determining that the first group of portlets includes a greater number of portlets than the second group of portlets; and prioritizing positioning of the first portlet over the fifth portlet based on the first group of portlets having the greater number of portlets than the second group of portlets.

14. The method of claim 13, wherein the first portlet is a newly added portlet having an initial default position on the portal page, and wherein querying the category attribute of the plurality of other portlets by the first portlet comprises querying the category attribute of the plurality of other portlets immediately surrounding the initial default position of the first portlet.

15. The method of claim 13, wherein the first portlet is an existing portlet moved from a first position to a second position on the portal page, and wherein querying the category attribute of the plurality of other portlets by the first portlet comprises querying the category attribute of the plurality of other portlets immediately surrounding the second position of the first portlet.

16. A computer program product for manipulating a portlet on a portal page, the computer program product comprising:

a computer readable medium having computer readable program code embodied therein, the computer readable program code comprising computer readable program code configured to:

add a first portlet to the portal page in an aggregation system of a portal server executing in a memory of a computer;

compare, by the first portlet, a category attribute of the first portlet and a second portlet;

identify, based upon the comparison, that the second portlet has a same category as the first portlet, but that a third portlet is positioned adjacent to the second portlet; and communicate, by the first portlet, a request to the third portlet for the third portlet to reposition itself so as to allow the first portlet to position itself adjacent to the second portlet and in a same row as the second portlet;

communicate, by the first portlet, a request to the second portlet for the second portlet to adjust its size in order to permit a positioning of the first portlet adjacent to the second portlet on the portal page in the same row as the second portlet;

position, responsive both to the repositioning of the third portlet and also to the adjustment of the size of the second portlet, the first portlet adjacent to the second portlet on the portal page but not aligned with the second portlet on the portal page in the same row as the second portlet, compute a size for the first portlet so as to align the first portlet with the second portlet on the portal page, and adjust the size of the first portlet based upon the computation such that the first portlet is aligned with the second portlet based upon the category attribute of the first portlet being the same as the category attribute of the second portlet; and determine that a fifth portlet is adjacent to at least one other portlet that has the same category as the fifth portlet;

determine that the first portlet belongs to a first group of portlets and that the fifth portlet belongs to a second group of portlets;

determine that the first group of portlets includes a greater number of portlets than the second group of portlets; and prioritize positioning of the first portlet over the fifth portlet based on the first group of portlets having the greater number of portlets than the second group of portlets.

17. The computer program product of claim 16, further comprising computer readable program code configured to adjust the size of the second portlet.

18. The computer program product of claim 17, wherein the computer readable program code configured to adjust the size of the second portlet comprises computer readable program code configured to adjust the size of the second portlet such that the first portlet is aligned with the second portlet.

19. The computer program product of claim 16, wherein the first portlet is a newly added portlet having an initial default position on the portal page.

20. The computer program product of claim 16, wherein the first portlet is an existing portlet moved from a first position to a second position on the portal page.

21. The computer program product of claim 16, wherein the computer readable program code configured to position the first portlet adjacent to the second portlet on the portal page comprises computer readable program code configured to position the first portlet adjacent to and on the same row as the second portlet.

22. The computer program product of claim 16, wherein the computer readable program code configured to position the first portlet adjacent to the second portlet on the portal page comprises computer readable program code configured to position the first portlet adjacent to and in a same column as the second portlet.

23. A computer program product for displaying portlets on a portal page, the computer program product comprising:

a computer readable medium having computer readable program code embodied therein, the computer readable program code comprising computer readable program code configured to:

add a first portlet to the portal page in an aggregation system of a portal server executing in a memory of a computer;

compare, by the first portlet, a category attribute of the first portlet with a category attribute of each of a plurality of other portlets;

identify, based upon the comparison, that a second portlet of the plurality of other portlets has a same category as the first portlet, but that a third portlet is positioned adjacent to the second portlet;

render the first portlet such that it is adjacent to the second portlet by the first portlet communicating a request to the third portlet for the third portlet to reposition itself so as to allow the first portlet to position itself adjacent to the second portlet and in a same row as the second portlet, the first portlet additionally communicating a request to the second portlet for the second portlet to adjust its size in order to permit a positioning of the first portlet adjacent to the second portlet on the portal page in the same row as the second portlet and, responsive both to the repositioning of the third portlet and also to the adjustment of the size of the second portlet, positioning the first portlet adjacent to the second portlet on the portal page but not aligned with the second portlet on the portal page in the same row as the second portlet, computing a size for the first portlet so as to align the first portlet with the second portlet on the portal page and adjusting the size of the first portlet based upon the computation such that the first portlet is aligned with the second portlet based upon the category attribute of the first portlet being the same as the category attribute of the second portlet; and determine that a fifth portlet is adjacent to at least one other portlet that has the same category as the fifth portlet;

determine that the first portlet belongs to a first group of portlets and that the fifth portlet belongs to a second group of portlets;

determine that the first group of portlets includes a greater number of portlets than the second group of portlets; and prioritize positioning of the first portlet over the fifth portlet based on the first group of portlets having the greater number of portlets than the second group of portlets.

24. The computer program product of claim 23, further comprising computer readable program code configured to adjust the size of the second portlet.

25. The computer program product of claim 24, wherein the computer readable program code configured to adjust the size of the second portlet comprises computer readable program code configured to adjust the size of the second portlet such that the first portlet is aligned with the second portlet.

26. The computer program product of claim 24, wherein the computer readable program code configured to adjust the size of the second portlet comprises computer readable program code configured to adjust the size of the second portlet such that the first portlet is aligned with all other portlets having the same category attribute as the first portlet.

27. The computer program product of claim 23, wherein the first portlet is a newly added portlet having an initial default position on the portal page, and wherein the computer readable program code configured to compare the category attribute of the first portlet with the category attribute of each of the plurality of other portlets comprises computer readable program code configured to compare the category attribute of the first portlet with the category attribute of each of the plurality of other portlets that are immediately surrounding the initial default position.

28. The computer program product of claim 23, wherein the first portlet is an existing portlet moved from a first position to a second position on the portal page, and wherein the computer readable program code configured to compare the category attribute of the first portlet with the category attribute of each of the plurality of other portlets comprises comparing the category attribute of the first portlet with the category attribute of each of the plurality of other portlets that are immediately surrounding the second position.

29. The computer program product of claim 23, wherein the computer readable program code configured to render the first portlet such that it is adjacent to the second portlet comprises computer readable program code configured to render the first portlet such that it is adjacent to and on the same row as the second portlet.

30. The computer program product of claim 23, wherein the computer readable program code configured to render the first portlet such that it is adjacent to the second portlet comprises computer readable program code configured to render the first portlet such that it is adjacent to and in a same column as the second portlet.

31. A computer program product for handling portlets on a portal page, the computer program product comprising:
a computer readable medium having computer readable program code embodied therein, the computer readable program code comprising computer readable program code configured to:
add the first portlet to a portal page in an aggregation system of a portal server executing in a memory of a computer;
query, by the first portlet, a category attribute of a plurality of other portlets nearby the first portlet;
identify, based upon the comparison, that a second portlet has a same category as the first portlet, but that a third portlet is positioned adjacent to the second portlet;
communicate, by the first portlet, a request to the third portlet for the third portlet to reposition itself so as to allow the first portlet to position itself adjacent to the second portlet and in a same row as the second portlet, the first portlet additionally communicating a request to the second portlet for the second portlet to adjust its a size in order to permit a positioning of the first portlet adjacent to the second portlet on the portal page in the same row as the second portlet;
position, responsive to both to the repositioning of the third portlet and also to the adjustment of the size of the second portlet, the first portlet adjacent to the second portlet on the portal page but not aligned with the second portlet on the portal page in the same row as the second portlet, compute a size for the first portlet so as to align the first portlet with the second portlet on the portal page and adjust the size of the first portlet based upon the computation such that the first portlet is aligned with the second portlet based upon the category attribute of the first portlet being the same as the category attribute of the second portlet,
the first portlet taking a position adjacent to at least one of the plurality of other portlets having the same category attribute as the first portlet; and
determine that a fifth portlet is adjacent to at least one other portlet that has the same category as the third portlet;
determine that the first portlet belongs to a first group of portlets and that the fifth portlet belongs to a second group of portlets;
determine that the first group of portlets includes a greater number of portlets than the second group of portlets; and
prioritize positioning of the first portlet over the fifth portlet based on the first group of portlets having the greater number of portlets than the second group of portlets.

32. The computer program product of claim 31, further comprising computer readable program code configured to have the first portlet cause at least one of the plurality of other portlets to adjust its size.

33. The computer program product of claim 32, wherein the computer readable program code configured to have the first portlet cause at least one of the plurality of other portlets to adjust its size comprises computer readable program code configured to have the first portlet cause the second portlet to adjust its size such that the first portlet is aligned with the second portlet.

34. The computer program product of claim 32, wherein the computer readable program code configured to have the first portlet cause at least one of the plurality of other portlets to adjust its size comprises computer readable program code configured to have the first portlet cause at least one of the plurality of other portlets to adjust its size such that the first portlet is aligned with all other portlets having the same category attribute as the first portlet.

35. The computer program product of claim 31, wherein the first portlet is a newly added portlet having an initial default position on the portal page, and wherein the computer readable program code configured to query the category attribute of the plurality of other portlets nearby the first portlet comprises computer readable program code configured to query the category attribute of the plurality of other portlets immediately surrounding the initial default position of the first portlet.

36. The computer program product of claim 31, wherein the first portlet is an existing portlet moved from a first position to a second position on the portal page, and wherein the computer readable program code configured to query the category attribute of the plurality of other portlets nearby the first portlet comprises computer readable program code configured to query the category attribute of the plurality of other portlets immediately surrounding the second position of the first portlet.

37. A method for positioning a portlet, the method comprising:
determining that a first portlet and a second portlet that is on a portal page have a same category;

determining that the first portlet and a third portlet do not have the same category, wherein the third portlet is positioned adjacent to the second portlet;

sending, by the first portlet, to the third portlet, a request for the third portlet to reposition itself such that the first portlet can be positioned adjacent to the second portlet;

in response to the third portlet repositioning itself, positioning the first portlet adjacent to the second portlet on the portal page; and determining that the third portlet is adjacent to at least one other portlet that has the same category as the third portlet;

determining that the first portlet belongs to a first group of portlets and that the third portlet belongs to a second group of portlets;

determining that the first group of portlets includes a greater number of portlets than the second group of portlets; and prioritizing positioning of the first portlet over the third portlet based on the first group of portlets having the greater number of portlets than the second group of portlets.

38. The method of claim 37, the method further comprising:

attempting, in response to determining that the first portlet and the second portlet have the same category, to position the first portlet adjacent to the second portlet; and determining that the first portlet cannot be positioned adjacent to the second portlet, wherein the sending the request to the third portlet is performed in response to the first portlet not being able to be positioned adjacent to the second portlet.

39. The method of claim 37, the method further comprising:

resizing one or more portlets on the portal page to enable the first portlet to be positioned adjacent to the second portlet.

40. The method of claim 39, wherein the one or more resized portlets include the second portlet and a fourth portlet.

41. The method of claim 39, wherein the one or more resized portlets include one or more of the first portlet or the third portlet.

42. The method of claim 37, wherein determining that the first portlet and the second portlet have the same category comprises:

querying, by the first portlet, one or more other portlets on the portal page for a category attribute.

43. The method of claim 37, wherein repositioning the third portlet comprises resizing the third portlet to create sufficient room on the portlet page for the first portlet to be added adjacent to the second portlet.

44. The method of claim 37, wherein the portal page includes a fourth portlet, the fourth portlet having the same category as the first and second portlets, and wherein positioning the first portlet adjacent to the second portlet on the portal page further comprises:

sizing the first portlet such that it is aligned with, and adjacent to, both the second portlet and the fourth portlet on the portal page.

45. A computer program product for handling portlets on a portal page, the computer program product comprising:

a computer readable medium having computer readable program code embodied therein, the computer readable program code being executable by a processor to cause the processor to perform a method comprising:

determining that a first portlet and a second portlet that is on a portal page have a same category;

determining that the first portlet and a third portlet do not have the same category, wherein the third portlet is positioned adjacent to the second portlet;

sending, by the first portlet, to the third portlet, a request for the third portlet to reposition itself such that the first portlet can be positioned adjacent to the second portlet;

in response to the third portlet repositioning itself, positioning the first portlet adjacent to the second portlet on the portal page;

determining that the third portlet is adjacent to at least one other portlet that has the same category as the fifth portlet;

determining that the first portlet belongs to a first group of portlets and that the third portlet belongs to a second group of portlets;

determining that the first group of portlets includes a greater number of portlets than the second group of portlets; and prioritizing positioning of the first portlet over the third portlet based on the first group of portlets having the greater number of portlets than the second group of portlets, wherein positioning the first portlet adjacent to the second portlet on the portal page further comprises sizing the first portlet such that it is aligned with, and adjacent to, both the second portlet and the fourth portlet on the portal page, and wherein the portal page includes a fourth portlet, the fourth portlet having the same category as the first and second portlets, and wherein the method further comprises.

46. The computer program product of claim 45, wherein the method further comprises:

attempting, in response to determining that the first portlet and the second portlet have the same category, to position the first portlet adjacent to the second portlet; and determining that the first portlet cannot be positioned adjacent to the second portlet, wherein the sending the request to the third portlet is performed in response to the first portlet not being able to be positioned adjacent to the second portlet.

* * * * *